United States Patent [19]
Stokland

[11] 3,853,131
[45] Dec. 10, 1974

[54] COMBINE HARVESTERS

[76] Inventor: Sigmund Stokland, 2380 Brumunddal, Norway

[22] Filed: Nov. 8, 1972

[21] Appl. No.: 304,801

[30] Foreign Application Priority Data
Nov. 8, 1971  Austria .............................. 9608/71

[52] U.S. Cl. ............................................ 130/27 F
[51] Int. Cl. ............................................ A01f 12/18
[58] Field of Search ..... 130/27 R, 27 F, 27 E, 27 L, 130/27 P, 26

[56] References Cited
UNITED STATES PATENTS

| | | | |
|---|---|---|---|
| 546,372 | 9/1895 | Wilson | 130/27 F |
| 1,781,198 | 11/1930 | Scranton | 130/27 F |
| 2,003,523 | 6/1935 | Thoen | 130/27 P |
| 3,011,497 | 12/1961 | Larsson et al. | 130/27 P |
| 3,115,142 | 12/1963 | Kepkay | 130/27 F |
| 3,381,455 | 5/1968 | Mitchell | 130/27 F |

*Primary Examiner*—A. F. Guida
*Attorney, Agent, or Firm*—Waters, Roditi, Schwartz & Nissen

[57] ABSTRACT

A combine harvester in which cut crop is conveyed to threshing means, and threshed material is fed to a straw walker, wherein a means is provided for separation of a portion from the stream of material discharging from the threshing means and directing this portion to an additional straw walker disposed below the first mentioned straw walker. A grate shaped baffle is arranged at the outlet of the threshing means and has spaced prongs forming limited longitudinal openings whose width is adapted to allow the desired part of the threshed material to pass through and onto the additional straw walker. A cutting device is arranged on the baffle to cut through the stream of straw discharging from the threshing means.

6 Claims, 4 Drawing Figures

PATENTED DEC 10 1974 3,853,131
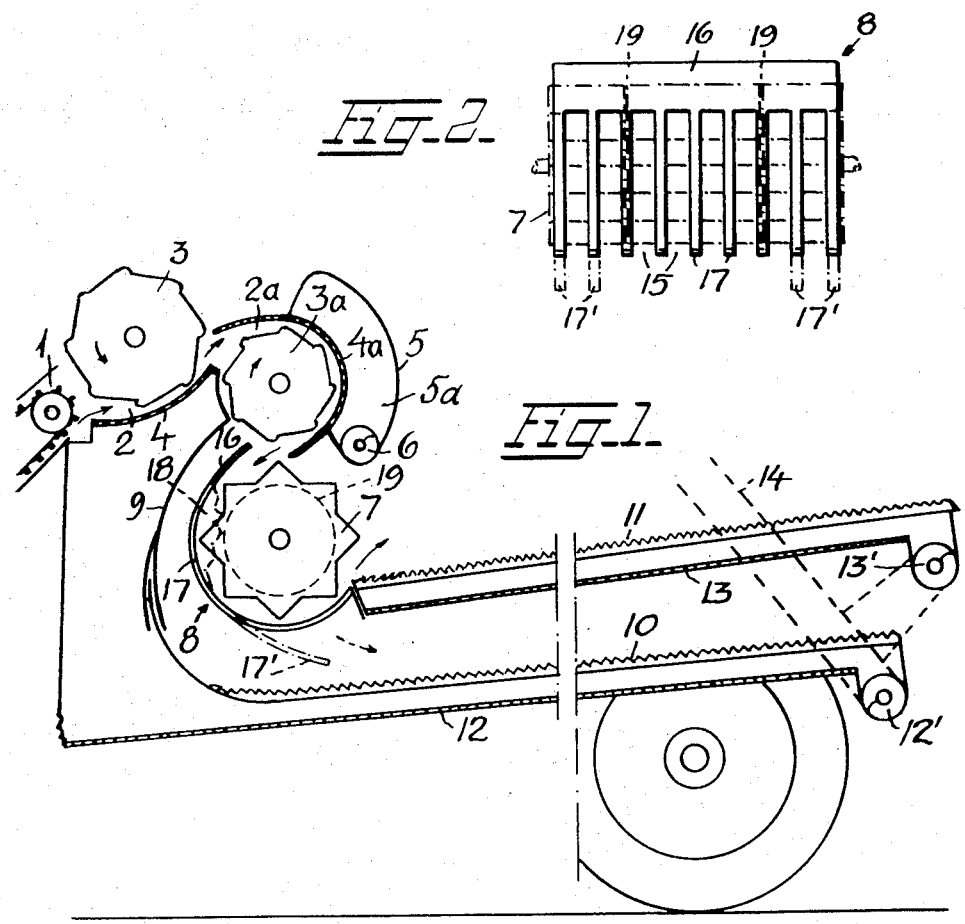
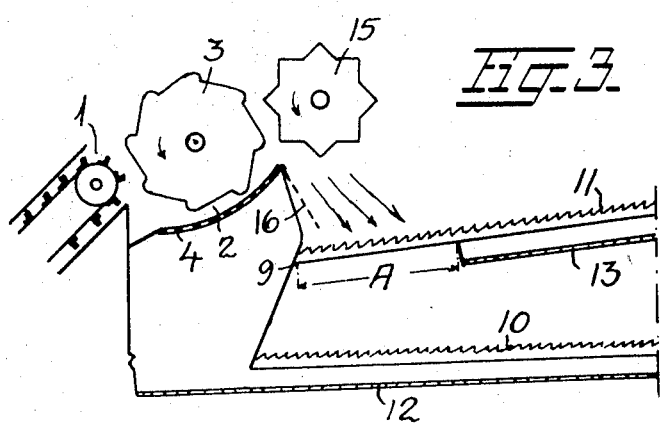
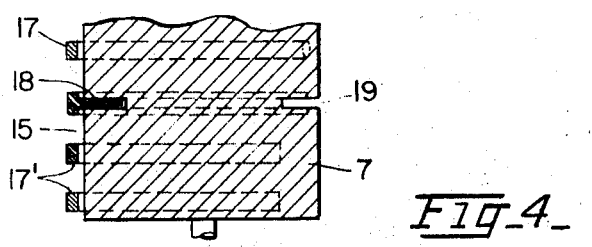

COMBINE HARVESTERS

The present invention relates to improvements in combine harvesters in which crop for threshing is conveyed from a crop cutting mechanism to at least one threshing stage from which threshed material is directed to a straw walker and separated grain, chaff etc. are passed to a cleaning apparatus.

In combine harvesters of the above type, the entire stream of threshed material from the threshing means is fed to a single straw walker which involves that grain retained in said material, due to great accumulation thereof on the straw walker and variations in the consistency of the straw, cannot be separated to the desired degree without overloading of the cleaning apparatus, a single straw walker therefore had to be extremely "open" and consequently allow passage of too great a quantity of straw.

An object of the present invention is to remove the above mentioned drawbacks by providing a dividing of the stream of threshed material from the threshing means for distribution and treatment in separate straw walkers whereby a substantially complete separation of grain from the straw material is obtained and simultaneously also a reduction in the loading of the cleaning apparatus.

According to the invention this is realized in that from the stream of threshed material from the threshing means there is separated a smaller or greater part which is delivered to an additional straw walker placed below the first mentioned straw walker.

The dividing of the part of the stream of threshed material and its passing to the additional straw walker may take place in different manners as will be described in the following description.

Specific embodiments of the invention will now be described by way of example with reference to the accompanying drawing, wherein:

FIG. 1, is a schematic fragmentary elevation view, partly in section, of a combine harvester embodying the invention, FIG. 2, is a fragmentary front view of the last turning drum mechanism, FIG. 3, is a schematic fragmentary elevation view, similar to FIG. 1, showing a modification of the invention, and FIG. 4 is a part sectional view through the drum turning mechanism showing a cutting member cooperating therewith.

In the drawing, numeral 1 denotes a conveying means for feeding crop from a crop cutting mechanism (not shown) to the inlet of a space 2 between a first rotary horizontal-axis threshing cylinder 3 and a stationary concave 4 cooperating therewith. The material which does not pass through the plate 4 is thrown from the outlet end of the space 2 and into the inlet end of a space 2a between a second threshing cylinder 3a and a concave 4a cooperating therewith in which the material is subjected to a second threshing stage.

The second threshing cylinder 3a rotates in opposite direction of that of the first cylinder 3 and the cooperating concave 4a surrounds the cylinder 3a and directs the material to the lower side thereof where it is received on a turning drum 7, rotating opposite to the cylinder 3a, and a cooperating baffle means, generally denoted at 8, which surrounds the front and lower side of said drum 7 and directs threshed material to a straw walker 11.

According to the invention, a separate straw walker 10 is positioned below the straw walker 11 and both straw walkers, having a width corresponding at least to the axial length of the threshing cylinders, are of conventional construction. Further the baffle means 8 (FIG. 2) cooperating with the turning drum 7 is formed to carry off a part of the threshed material and convey said part to the second straw walker 10. This is obtained in that said baffle means 8 is formed as a grate having prongs 17 defining longitudinal parallel openings 15, extending from an upper transverse solid part 16 to the end of the grate 8.

When in this arrangement the threshed material is directed along the baffle grate 8, the openings 15, thereof, whose width is adapted to the consistency of the straw, allow grain, chaff, broken straw and minor particles to pass through and be delivered to the straw walker 10.

In order to determine the quantity of material or straw to be directed from the drum 7 to the lower straw walker 10, which quantity for instance may amount to about 30 percent, the width of the openings 15 of the grate 8 is adapted to the consistency of the straw. In connection with straw having the necessary dryness, the desired result may be obtained by making the width of the openings of about 40 mm.

In connection with less dry straw, the dividing may take place in that a suitable number of the prongs 17 of the grate 8 are somewhat straightened and bent downwardly, as shown with dot-and-dash lines at 17' in the drawing, whereby a corresponding part of the advancing stream of straw is carried off in transverse direction of the stream and directed to the lower straw walker 10.

As shown in FIG. 2 the two outer prongs 17' at each side of the grate 8 are bent downwardly and thereby, in the embodiment shown, about a fourth of the width of the straw stream at each end of the drum 7 is separated and directed to the lower straw walker 10 and distributed thereon, while the remaining central half is guided to the straw walker 11.

In order to ensure a dividing which does not exert influence on the even feeding of the straw due to the fact that straw lying more or less across the separation line will be carried away by the separated part and thereby might effect trouble, there is provided on the prong 17' adjacent to the bent down prongs 17 a sheet-shaped cutting member 18 projecting into a corresponding circumferential slit 19 on the drum 7, said cutting member during rotation of the drum 7, cutting the stream of straw to release completely said outer fourth for feeding to the lower straw walker 10. In similar manner, one half of the stream of straw may be separated and directed to the lower straw walker. In this connection the central prong 17 of the baffle grate 8 can be provided with a cutting member 18 projecting into a corresponding circumferential slit in the turning drum 7 and the prongs located to one of the sides of the central prong are somewhat straightened and downwardly bent as previously described.

In feeding the crop for threshing through the first and second threshing stages the essential part of the grain is separated through the concaves 4 and 4a resepctively. Grain, chaff etc. from the concave 4 is delivered, via a baffle plate 9 to a shaking table 12 and from the concave 4a to a chamber 5, while the threshed material discharged from the outlet end of the last threshing stage is directed to the drum 7 which in cooperation with the baffle grate 8 distributes the material to the two straw walkers 10 and 11 in the elected proportions and in easily workable layers. Grain, chaff etc. separated through the straw walker 10 are delivered to the shaking table 12 and from the straw walker 11 to a shaking table 13 mounted therebelow, and straw from both straw walkers is discharged at the rear end of the harvester in the usual manner.

Each of the shaking tables 12, 13 carries the grain, chaff and other particles to a respective transverse conveyer screw 12' and 13' which pass the material to a conventional transport means 14, such as an elevator, arranged at the side of the threshing machine for transporting said material up to a cleaning apparatus (not shown) positioned above the upper straw walker 11. The grain etc. separated through the concave 4a of the second threshing stage into the chamber 5a is transported by a transverse conveyer screw 6 to the cleaning apparatus in a similar manner.

FIG. 3 illustrates a somewhat modified embodiment of the invention adapted to a single threshing stage. In this embodiment, the crop for threshing is fed by means of a conveyor 1 into the space 2 between the threshing cylinder 3 and the cooperating concave 4, and the threshed material discharged from the outlet end of said space 2 is directed by means of a beater or throwing drum 15 onto the upper straw walker 11.

In order to allow feeding of a desired part of threshed material from the space 2 to the lower straw walker 10, the longitudinal part, denoted A, of the upper straw walker 11 below the beater 15 against which said material is thrown, is provided with an "open" construction, that is, the interspaces between the transverse members of the straw walker are increased in dependence of the consistency of the material and the quantity thereof which is desired to pass through and down to the lower straw walker 10. In this case the shaking table 13 extends only to the rear end of the said open construction part A, as shown.

In order to regulate the quantity passing through said open part A, a baffle plate 16 is pivotably mounted at the upper end of the baffle 9 and may be placed in different angle positions thereby to regulate the effective area of said open construction part against which threshed material may be thrown, as will easily be understood.

I claim:

1. A combine harvester comprising a threshing means for receiving cut crop to thresh the same and deliver a stream of threshed material, a first upper straw walker for receiving threshed material from the threshing means, a second lower straw walker disposed below the first straw walker also for receiving threshed material from the threshing means, each of said straw walkers having a respective cooperating shaking table therebeneath for delivering material independently of the other, and separating means disposed between the threshing means and said first and second straw walkers for receiving the stream of threshed material and directing a portion of said stream of threshed material to said lower straw walker and the remainder of the threshed material to said upper straw walker, said separator means comprising a grate-shaped baffle means having openings through which a part of the stream of threshed material is fed to the lower straw walker while the remainder of said stream of the threshed material is passed and fed to the upper straw walker.

2. A harvester as claimed in claim 1 wherein said separator means further comprises a turning drum, said baffle means comprising a grate adjacent said drum and including parallel spaced prongs defining said openings therebetween, said prongs extending from an upper transverse solid part to the end of the grate, said openings having a width adapted to the consistency of the threshed material so as to allow flow onto the lower straw walker.

3. A harvester as claimed in claim 2 wherein only some prongs of the baffle grate has a rear end portion which is somewhat straightened and bent downwardly so as to increase the portion of threshed material directed onto the lower straw walker.

4. A harvester as claimed in claim 3 comprising a sheet-shaped cutting member disposed adjacent the downwardly bent prongs and projecting into a circumferential slit provided in the turning drum.

5. A harvester as claimed in claim 1 wherein said baffle means is constituted by an open portion of said upper straw walker through which said portion of said threshed material can be fed to the lower straw walker.

6. A harvester as claimed in claim 5 wherein said separator means further comprises a throwing drum, said baffle means further comprising a baffle plate pivotably mounted below said throwing drum and adapted to be placed in different angular positions to regulate the effective open area of said open portion through which threshed material may be passed.

* * * * *